United States Patent
Long et al.

(10) Patent No.: US 12,499,224 B2
(45) Date of Patent: Dec. 16, 2025

(54) DETECTING MALICIOUS ACTIVITY BASED ON ACCESSES TO STABLE DATA STORAGE OBJECTS

(71) Applicant: Dell Products L.P., Hopkinton, MA (US)

(72) Inventors: Matthew Long, Pocasset, MA (US); Dan Aharoni, Brookline, MA (US); Arieh Don, Newton, MA (US)

(73) Assignee: Dell Products L.P., Hopkinton, MA (US)

(*) Notice: Subject to any disclaimer, the term of this patent is extended or adjusted under 35 U.S.C. 154(b) by 55 days.

(21) Appl. No.: 18/610,329

(22) Filed: Mar. 20, 2024

(65) Prior Publication Data

US 2025/0298890 A1    Sep. 25, 2025

(51) Int. Cl.
*G06F 21/55*    (2013.01)

(52) U.S. Cl.
CPC ...... *G06F 21/554* (2013.01); *G06F 2221/034* (2013.01)

(58) Field of Classification Search
CPC .......................... G06F 21/554; G06F 2221/034
See application file for complete search history.

(56) References Cited

U.S. PATENT DOCUMENTS

| | | | | |
|---|---|---|---|---|
| 10,867,040 B2* | 12/2020 | Gibbons, Jr. | ......... | G06F 21/552 |
| 11,720,714 B2* | 8/2023 | Miller | .............. | G06F 3/0622 |
| | | | | 726/26 |
| 12,061,695 B2* | 8/2024 | Algieri | .................. | G06F 21/561 |
| 2020/0042707 A1* | 2/2020 | Kucherov | ............. | G06F 3/0683 |
| 2021/0124826 A1* | 4/2021 | Matsuda | ............ | G06F 21/6218 |
| 2022/0138169 A1* | 5/2022 | Yelheri | ................. | G06F 16/182 |
| | | | | 707/695 |
| 2024/0045964 A1* | 2/2024 | Bednash | ............. | G06F 11/1451 |
| 2024/0202332 A1* | 6/2024 | Swami | ................ | G06F 11/1469 |
| 2024/0248604 A1* | 7/2024 | Dar | ....................... | G06F 3/0655 |
| 2025/0036569 A1* | 1/2025 | Vankamamidi | ...... | G06F 12/0875 |
| 2025/0103706 A1* | 3/2025 | Zhang | ................... | G06F 21/554 |

FOREIGN PATENT DOCUMENTS

CN             116708560 A   *   9/2023   ........... H04L 67/565

* cited by examiner

*Primary Examiner* — Christopher A Revak

(74) *Attorney, Agent, or Firm* — Anderson Gorecki LLP

(57) ABSTRACT

Cyber-attacks on data maintained by a storage node are detected by monitoring for suspicious IOs to storage objects that contain only stable data. Data may be inherently stable or become stable based on elapsed time since the most recent update. Suspicious IOs to stable data storage objects include WR IOs that update stable data and, potentially, large-scale RD IOs. Metadata associated with storage objects is scanned to identify stable data storage objects and monitor for suspicious IOs. Further, stable data storage objects can be created by separating stable data from dynamic data, e.g., moving old data to a storage object that contains only old data. Exceptions are made for WR IOs that update metadata when processing small-scale RDs.

20 Claims, 3 Drawing Sheets

DETECTING MALICIOUS ACTIVITY BASED ON ACCESSES TO STABLE DATA STORAGE OBJECTS

TECHNICAL FIELD

The subject matter of this disclosure is generally related to electronic data storage.

BACKGROUND

A data center can include a large number of rack-based servers and data storage nodes such as Network-Attached Storage (NAS), Storage Area Networks (SANs), and storage arrays. The data storage nodes maintain logical disk drives known as storage objects that contain host application data that can be contemporaneously accessed by instances of host applications running on the servers. The data can be targeted by malicious attackers who gain access to one of the servers. A ransomware attack, for example, encrypts the data so that it becomes inaccessible in order to support a demand for payment of a ransom. A purely destructive attack deletes or corrupts the data. An attacker may even leave the data unaltered but steal the data by reading it from the storage objects. There is a growing need to detect and stop such attacks.

SUMMARY

A method in accordance with some implementations comprises: monitoring host server input-output (IO) access to each of a plurality of stable data storage objects that contain only stable data and are maintained by a data storage node; and responsive to detecting a data write (WR) IO to one of the stable data storage objects, implementing a malicious attack response, including electronically signaling an alert.

An apparatus in accordance with some implementations comprises: an input-output (IO) access activity monitor running on a storage node and configured to monitor host server IOs that access any of a plurality of stable data storage objects that contain only stable data and are maintained by the data storage node, the IO access activity monitor further configured to detect a data write (WR) IO to one of the stable data storage objects and, in response, implement a malicious attack response that includes electronically signaling an alert.

In accordance with some implementations a non-transitory computer-readable storage medium stores instructions that when executed by a computer cause the computer to perform a method comprising: monitoring host server input-output (IO) access to each of a plurality of stable data storage objects that contain only stable data and are maintained by a data storage node; and responsive to detecting a data write (WR) IO to one of the stable data storage objects, implementing a malicious attack response, including electronically signaling an alert.

This summary is not intended to limit the scope of the claims or the disclosure. Other aspects, features, and implementations will become apparent in view of the detailed description and figures. Moreover, all the examples, aspects, implementations, and features can be combined in any technically possible way.

DETAILED DESCRIPTION

The terminology used in this disclosure is intended to be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" are used to refer to features that are abstractions of other features, for example, and without limitation, abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and a storage array. Such implementations should not be viewed as limiting. Those of ordinary skill in the art will recognize that there are a wide variety of implementations of inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
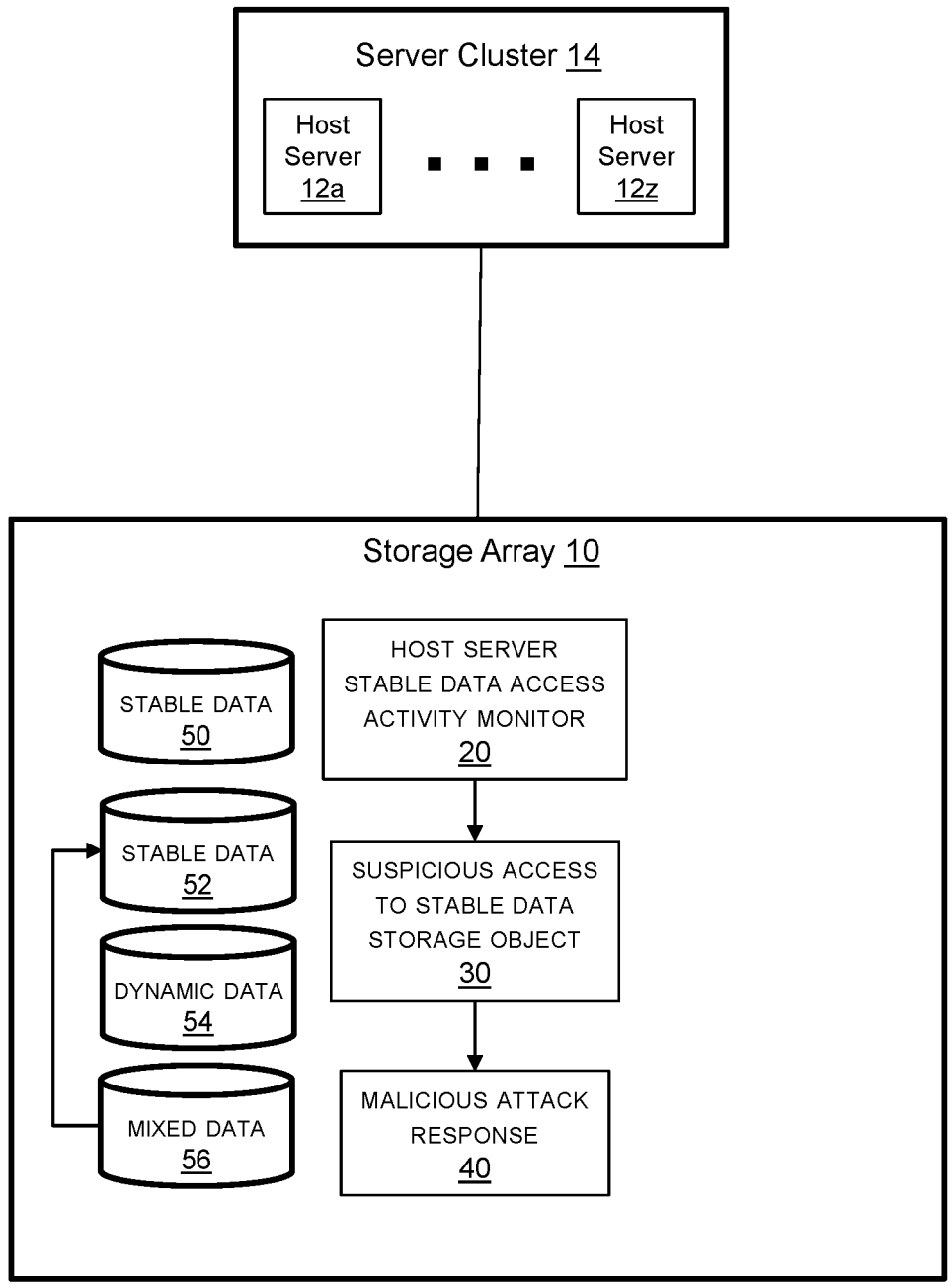
FIG. 1 illustrates a data center in which a storage array is configured to detect a malicious cyber-attack based on suspicious access to a stable data storage object.

FIG. 1 illustrates a simplified data center in which a storage node is configured to detect a cyber-attack based on suspicious access to a stable data storage object. The illustrated data center includes a cluster 14 of host servers 12a-12z and a storage array 10. The storage array has a host server stable data access activity monitor 20, which may include software, specialized hardware, or a combination of both. The host server stable data access activity monitor is configured to monitor host-initiated access to stable data storage objects.

The host application data maintained by the storage array includes both stable data and dynamic data. Stable data does not change, other than through accident or malicious activity. Dynamic data is data that may be updated by host application activity, and thus is not stable. Some types of storage objects (represented by stable data storage object 50) are inherently stable. A snapshot volume, for example, contains only stable data and is inherently stable. However, many storage objects (represented by mixed data storage object 56) contain both stable data and dynamic data. If practical, the stable data is moved away from the mixed data storage object 56 to a stable data storage object 52 that contains only stable data. Such separation of stable data from dynamic data may result in the creation of stable data storage object 52 and a dynamic data storage object 54 that contains only dynamic data. Separation of stable data from dynamic data also tends to increase the number of stable data storage objects maintained by the storage array.

The host server stable data access activity monitor 20 is configured to monitor input-output (IO) commands sent by host servers to access any of the stable data storage objects maintained by the storage array. Detection of suspicious access 30 to a monitored stable data storage object triggers a malicious attack response 40. Examples of suspicious access can include any WR access and large-scale read (RD) access, where large-scale is defined in terms of RD size, number of blocks per unit time, or both.

Age of data is used as an indicator of stability in some implementations. The probability that any extent of data or a storage object will be updated decreases in proportion to the amount of time that has elapsed without any updates being performed. For example, inventory data for the current month may be dynamic in the current month but become stable next month or next year. The age of data and storage objects is tracked using timestamps in metadata, where age is defined by time since the most recent WR access. The amount of time that must elapse before data and storage objects are considered to be old, and thus stable, rather than new, and thus dynamic, is user-configurable and may be dependent on data type or be host application-dependent. Old data is considered to be stable data, so storage objects that contain only old data are considered to be stable data storage objects. The stable data access activity monitor may be configured to identify all storage objects with a "last WR date" of X years/months ago, where X is user-configured. The identified storage objects are tagged as stable and the last WR to each of those storage objects is monitored to detect suspicious access. Stable data storage objects can be created by manually separating old data from new data. Separation can be implemented at least somewhat autonomously by some databases, e.g., DB2 and Oracle. For example, the database may be configured to move all data older than 2 years to a separate volume that becomes a stable data storage object.

Old data is not necessarily cold data. Cold data is data that has not been accessed recently by either a RD or WR. Old data may be frequently accessed in RD operations, but not WR operations. A RD can include a metadata WR to record information such as a RD access timestamp. Such metadata WRs associated with RD activity are not considered suspicious data WR operations. Exceptions can be made on the basis of a WR being to metadata, being under a minimum size, e.g., <128 k, and including only a limited number of WR commands, e.g., less than 10 over a predefined time period.

Figure 2:
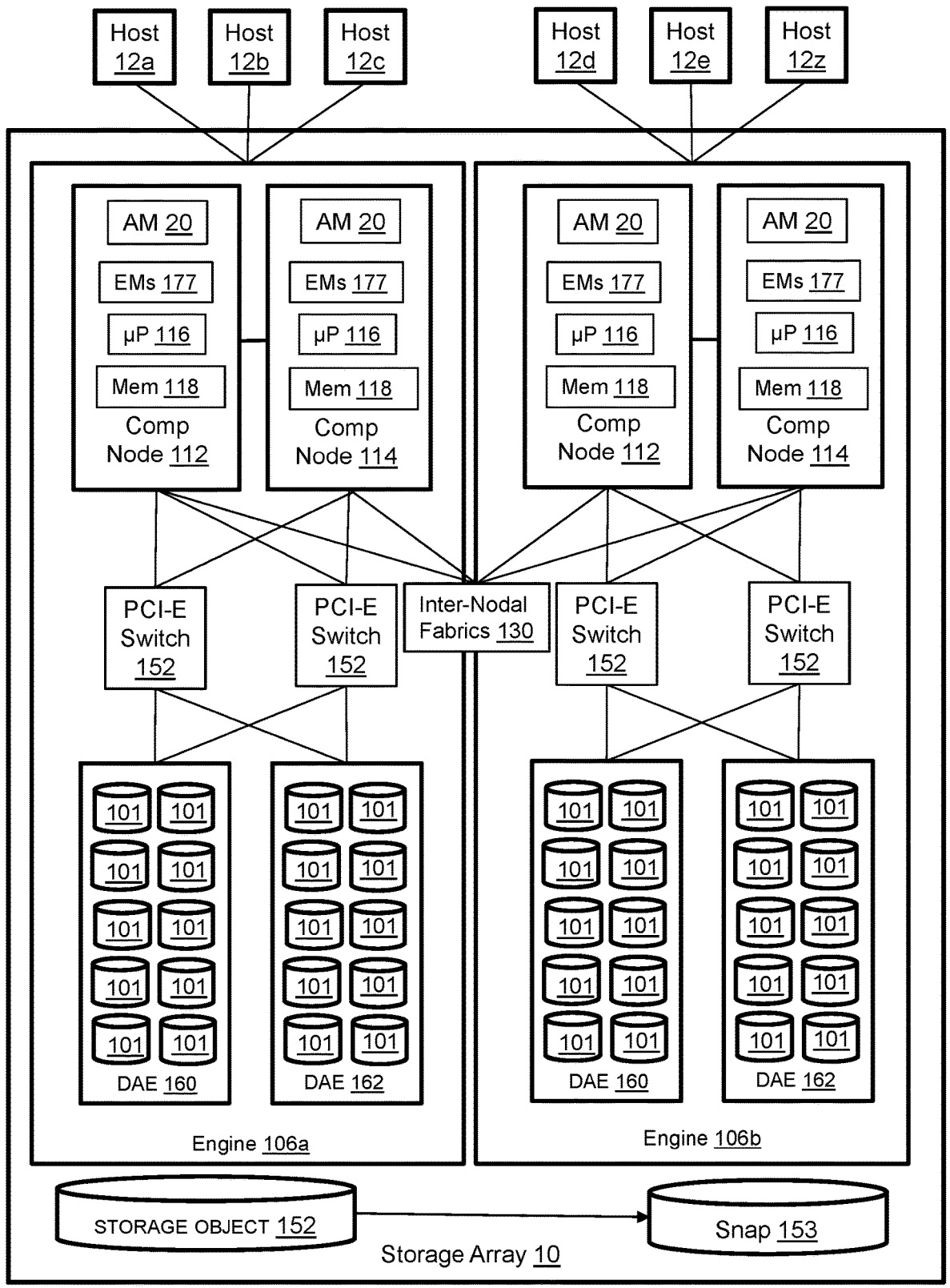
FIG. 2 illustrates the storage array in greater detail.

FIG. 2 illustrates storage array 10 in greater detail. The storage array is shown with two engines 106*a*, 106*b*, but might include any number of engines. The engines are interconnected via redundant inter-nodal channel-based InfiniBand fabrics 130. Each engine includes disk array enclosures (DAEs) 160, 162 and a pair of peripheral component interconnect express (PCI-e) interconnected compute nodes 112, 114 (aka storage directors) in a failover relationship. Within each engine, the compute nodes and DAEs are interconnected via redundant PCI-e switches 152. Each DAE includes managed drives 101 that are non-volatile storage media that may be of any type, e.g., solid-state drives (SSDs) based on nonvolatile memory express (NVMe) and EEPROM technology such as NAND and NOR flash memory.

Each compute node 112, 114 is implemented as a separate printed circuit board and includes resources such as at least one multi-core processor 116 and local memory 118. Processor 116 may include central processing units (CPUs), graphics processing units (GPUs), or both. The local memory 118 may include volatile media such as dynamic random-access memory (DRAM), non-volatile memory (NVM) such as storage class memory (SCM), or both. Each compute node includes one or more adapters and ports for communicating with host servers 12*a*-12*z* for servicing IOs from the host servers. Each compute node also includes one or more adapters for communicating with other compute nodes via the redundant inter-nodal channel-based InfiniBand fabrics 130. The processors 116 run threads of emulations (EMs 177) for performing different storage-related tasks and functions. Front-end emulations handle communications with the host servers 150. For example, front-end emulations receive IO commands from host servers and return data and write acknowledgements to the host servers. Back-end emulations handle communications with managed drives 101 in the DAEs 160, 162. Data services emulations process IOs. Remote data services emulations handle communications with other storage systems, e.g., other storage arrays for remote replication and remote snapshot creation. Instances of host server activity monitors 20 run on processors 116 and may exist in the memory and on the managed drives.

A host application image, which contains all data generated and used by a host application, is persistently stored on the managed drives 101 and logically stored on storage object 152. Without limitation, storage objects may be referred to as volumes, devices, or LUNs. From the perspective of the host servers, storage object 152 is a single disk or set of disks having logical block addresses (LBAs) on which data used by the instances of a host application resides. However, the host application data is stored at non-contiguous addresses distributed on the managed drives 101. Locally stored metadata maps between the LBAs of storage object 152 and physical addresses of the managed drives 101. There may be a large number of host servers running multiple host applications and the storage array may maintain a large number of storage objects. Storage object 152 may be periodically snapped, e.g., creating snapshot 153. Snapshot 153 is inherently stable, so it is a stable data storage object. Storage object 152 may initially contain stable and dynamic data. The stable data may be moved to a separate stable data storage object or storage object 152 may become stable over time.

Figure 3:
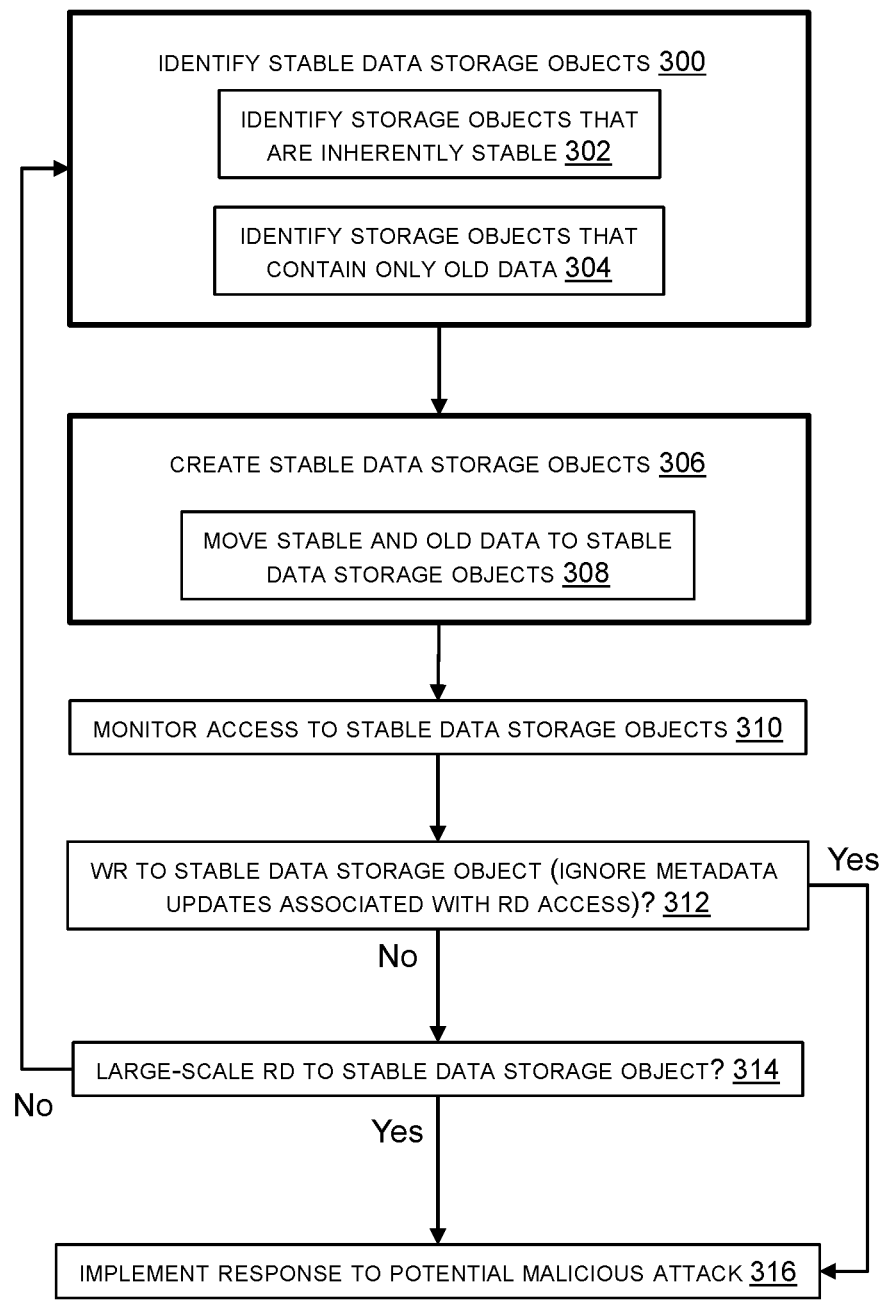
FIG. 3 illustrates a method for detecting a malicious attack based on suspicious access to a stable data storage object.

FIG. 3 illustrates a method for detecting a malicious cyber-attack based on suspicious access to a stable data storage object. Steps of the method may be implemented in part by the host server stable data activity monitor. Step 300 is identifying stable data storage objects that are maintained by the storage node. Stable data storage objects are storage objects that contain only stable data. Stable data is data that does not change other than through accident or malicious activity. Metadata associated with the storage objects maintained by the data storage node can be scanned to identify storage objects that are stable. Sub-steps include identifying storage objects that are inherently stable 302 and identifying storage objects that contain only old data 304, where "old" is defined in terms of elapsed time since most recent data WR access, which is in a metadata timestamp. As previously mentioned, exceptions are made for small size and low count metadata WRs associated with RDs such that those WR IOs are not considered to be suspicious data WRs. Step 306 is creating stable data storage objects for the purpose of detecting malicious attacks. This may include moving stable and old data from a mixed data storage object to stable data storage objects as indicated in sub-step 308.

Step 310 is monitoring host server accesses to the identified and created stable data storage objects maintained by the storage node. Monitoring may include scanning the metadata, e.g., most recent access timestamps, associated with the monitored storage objects. Although step 310 is shown in a series of steps, monitoring may be performed continuously. If monitoring results in detection of a WR access to a stable data storage object (a WR that updates stable data) as determined in step 312, then a predefined response to a potential malicious attack is implemented as shown in step 316. Metadata updates (WRs) associated with RD accesses, such as small size, low count WRs, to the stable data storage objects are not considered to be WR accesses to the stable data. If monitoring the stable data storage objects results in detection of a large-scale RD access to a stable data storage object as determined in step 314, then the predefined response to a potential malicious attack is implemented as shown in step 316. Identification of stable data storage objects and creation of stable data storage objects in steps 300, 306 are performed iteratively.

The predefined response to potential malicious attack of step 316 may include a wide variety of actions, alone or in combination. Alerts may be generated and logged. For example, a notification alone may be generated in response to detection of a large-scale RD because there are legitimate and malicious reasons for such RDs. WR access from the host server to the stable data storage object or all storage objects may be disabled. A malware detection program may be run. Any of the steps or actions may be optionally disabled on a per-storage object basis.

Stable data storage objects advantageously provide a reliable and efficient way to detect malicious cyber-attacks. It is generally desirable to avoid generating false alarms without missing actual attacks. Detecting WR access to storage objects is a relatively inexpensive task in terms of CPU and memory resources. Moreover, WRs to stable data storage objects are a strong indicator of a problem. Malware is not configured to distinguish between stable and dynamic or mixed storage objects, so the likelihood of a stable data storage object being targeted may be the same as the likelihood of a dynamic or mixed storage object being targeted. Further, the number of stable data storage objects can be increased by creating stable data storage objects that are not inherently stable, thereby potentially increasing the likelihood that a stable data storage object will be accessed by malware in a cyber-attack and decreasing the elapsed time between the start of an attack and detection.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method comprising:
monitoring host server input-output (IO) access to each of a plurality of stable data storage objects that contain only host application data that is stable data and are maintained by a data storage node; and
responsive to detecting a data write (WR) IO to one of the stable data storage objects, implementing a malicious attack response, including electronically signaling an alert.

2. The method of claim 1 further comprising implementing the malicious attack response in response to detecting a large-scale data read (RD) IO to one of the stable data storage objects.

3. The method of claim 1 further comprising scanning metadata to identify the stable data storage objects maintained by the data storage node.

4. The method of claim 3 further comprising identifying storage objects that are inherently stable.

5. The method of claim 3 further comprising identifying storage objects that contain only old data.

6. The method of claim 1 further comprising creating a stable data storage object by separating stable data and dynamic data to different storage objects.

7. The method of claim 1 further comprising creating a stable data storage object by moving old data from a storage object that contains old data and new data to the stable data storage object.

8. An apparatus comprising:
an input-output (IO) access activity monitor running on a storage node and configured to monitor host server IOs that access any of a plurality of stable data storage objects that contain only host application data that is stable data and are maintained by the data storage node, the IO access activity monitor further configured to detect a data write (WR) IO to one of the stable data storage objects and, in response, implement a malicious attack response that includes electronically signaling an alert.

9. The apparatus of claim 8 further comprising the IO access activity monitor configured to implement the malicious attack response in response to detection of a large-scale data read (RD) IO to one of the stable data storage objects.

10. The apparatus of claim 8 further comprising the IO access activity monitor configured to scan metadata to identify the stable data storage objects maintained by the data storage node.

11. The apparatus of claim 10 further comprising the IO access activity monitor configured to identify storage objects that are inherently stable.

12. The apparatus of claim 10 further comprising the IO access activity monitor configured to identify storage objects that contain only old data.

13. The apparatus of claim 8 further comprising the IO access activity monitor configured to create a stable data storage object by separating stable data and dynamic data to different storage objects.

14. The apparatus of claim 8 further comprising the IO access activity monitor configured to create a stable data storage object by moving old data from a storage object that contains old data and new data to the stable data storage object.

15. A non-transitory computer-readable storage medium storing instructions that when executed by a computer cause the computer to perform a method comprising:

monitoring host server input-output (IO) access to each of a plurality of stable data storage objects that contain only host application data that is stable data and are maintained by a data storage node; and responsive to detecting a data write (WR) IO to one of the stable data storage objects, implementing a malicious attack response, including electronically signaling an alert.

16. The non-transitory computer-readable storage medium of claim 15 in which the method further comprises implementing the malicious attack response in response to detecting a large-scale data read (RD) IO to one of the stable data storage objects.

17. The non-transitory computer-readable storage medium of claim 15 in which the method further comprises scanning metadata to identify the stable data storage objects maintained by the data storage node.

18. The non-transitory computer-readable storage medium of claim 17 in which the method further comprises identifying storage objects that are inherently stable.

19. The non-transitory computer-readable storage medium of claim 17 in which the method further comprises identifying storage objects that contain only old data.

20. The non-transitory computer-readable storage medium of claim 15 in which the method further comprises creating a stable data storage object by separating stable data and dynamic data to different storage objects.

\* \* \* \* \*